Patented June 11, 1929.

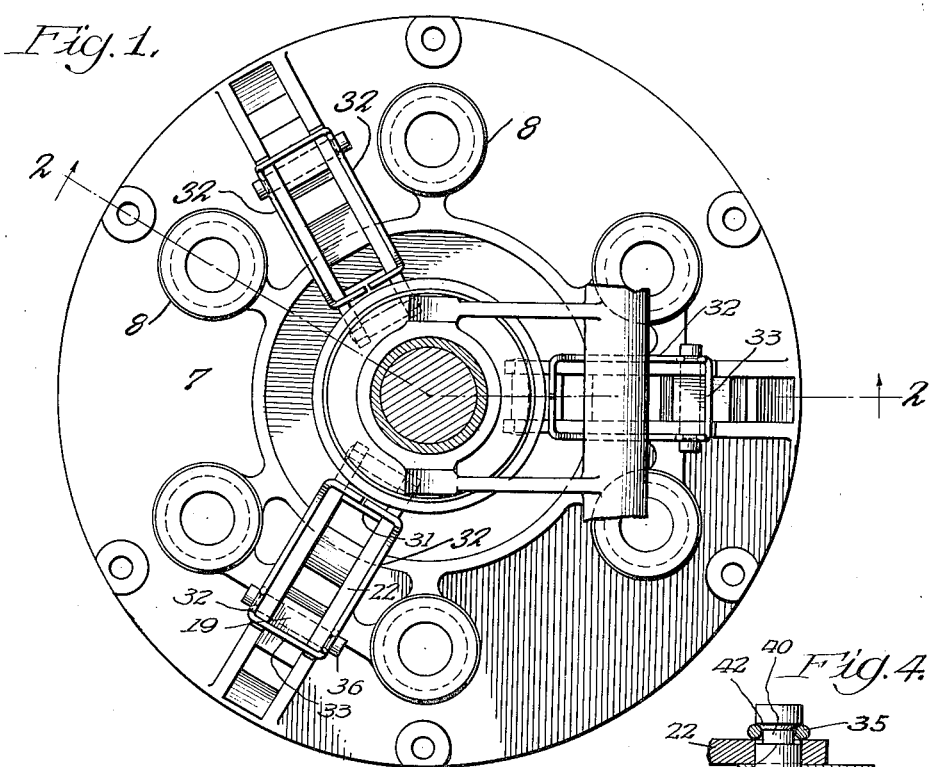
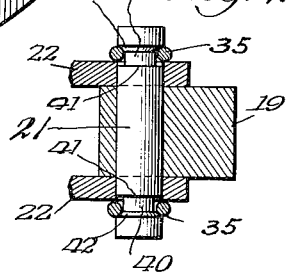
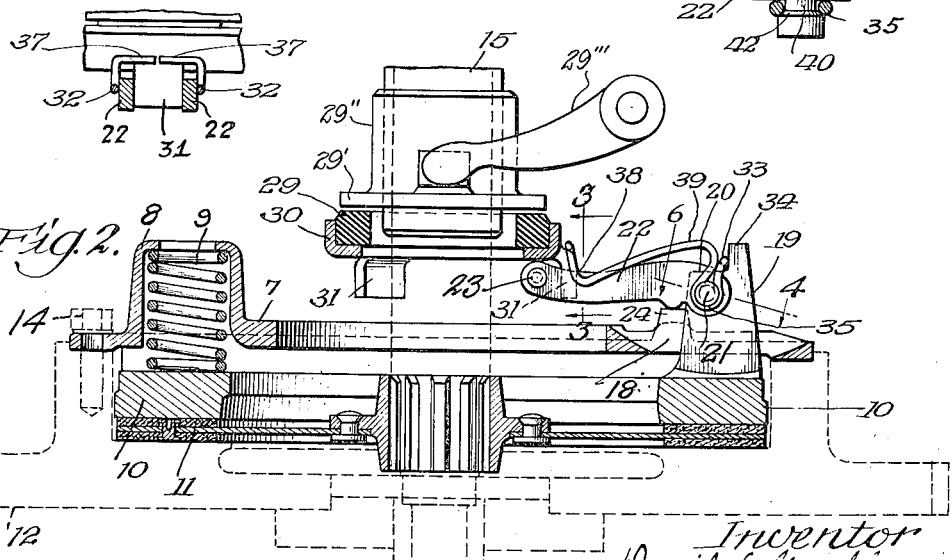

1,716,436

UNITED STATES PATENT OFFICE.

DAVID E. GAMBLE, OF DETROIT, MICHIGAN, ASSIGNOR TO THE BORG & BECK COMPANY, OF CHICAGO, ILLINOIS, A CORPORATION OF ILLINOIS.

CLUTCH.

Application filed June 28, 1926. Serial No. 118,883.

This invention relates to friction clutches of the type which are adapted for their principal commercial use to be incorporated in automobiles or other motor driven vehicles.

The object of this invention is to provide a friction clutch of novel construction including improved means for releasing the thrust or pressure ring. Further objects of the invention are to provide improved means for effecting the quick release of the thrust or pressure ring and also to prevent the releasing devices from rattling and becoming noisy in operation.

In the accompanying drawings illustrating the invention

Fig. 1 is a plan view, partly in section, showing an embodiment of the invention.

Fig. 2 is a sectional view on the line 2—2 of Fig. 1.

Fig. 3 is a sectional view on the line 3—3 of Fig. 2.

Fig. 4 is a sectional view on the line 4—4 of Fig. 2.

Referring to the drawings, 7 is the cover plate of the clutch which is provided with sockets 8 to receive springs 9 which bear directly upon the thrust or pressure ring 10 and press the friction faced driven plate 11 into engagement with the fly-wheel 12 which is made fast to the driving or crank shaft. The cover plate is secured to the fly-wheel by bolts 14 and the driven plate 11 is mounted on the driven shaft 15.

The cover plate is provided with a plurality of openings which can be conveniently made by milling slots 18 therein adjacent to the periphery of the plate and extending radially thereof. The spring sockets 8 are arranged in pairs on the cover plate, the pairs being spaced apart and the sockets of each pair being spaced apart symmetrically, and the openings 18 are located between the sockets of each pair. The thrust or pressure ring 10 has integral posts 19 which project up through the openings 18 in the cover plate and these posts have recesses 20 at their outer ends and at the inner sides thereof. In each of the posts 19 there is a pivot pin 21 which extends transversely through the post and two levers 22 are mounted on the ends of the pin. These levers project inwardly and radially of the cover plate and their inner ends are connected by a cross bar 23. On each side of each opening 18 there is a fulcrum 24 integral with the cover plate to be engaged by levers 22 and these fulcrums are located closely adjacent to the pivot pins 21. This construction and arrangement of the lever devices provides very efficient operation with a minimum of power and thereby produces a clutch which will respond quickly and freely in operation and under comparatively little power.

I have shown the clutch provided with an anti-friction bearing which is more particularly disclosed in my co-pending application Serial No. 109,238, filed May 15, 1926 and comprising an anti-friction bearing block 29 seated in a cup 30 which has fingers 31 projecting therefrom, one of said fingers being located between the levers 22 of each pair. The bearing block 29 engages the plate 29' on a sleeve 29" which is slidably moved on the driven shaft 15 by clutch release yoke 29'''. The bearing is carried by the clutch levers and it slides freely upon the driven shaft. To hold the levers in operative position in contact with the fulcrum on the cover plate and to prevent them from rattling or otherwise becoming noisy in operation I provide springs which are engaged with the pivot pins 21 and with the cup 30. Each spring is conveniently made of a single piece of spring wire in the form of a large loop having two legs or sides 32 connected by an integral cross bar 33 which is engaged with the outer end 34 of the post 19. Adjacent this cross bar end of the loop the legs are bent to form eyes 35 to receive the ends of the pivot pin 21 which is mounted in the post 19 under the recess 20 in the outer end of the post in which the cross bar 33 rests. This brings the fulcrums 24 and the pivot of the levers 22 close together. The free ends 37 of the spring legs are bent inwardly towards each other to adjacent relation above the finger 31. Adjacent these ends 37 these spring legs are provided with a bend 38 towards the cover plate, and adjacent the eyes 35 these spring legs are provided with bends or humps 39 projecting away from the cover plate. The two spring legs are made alike and in side elevation they present a general Z-shape. The springs act upon the clutch release bearing by engagement of the free ends 37 with the fingers 31. The free ends of the levers 22 project radially inward of the clutch and contact with the face of the clutch release bearing. The eyes 35 of the spring are seated in peripheral grooves 40 in the pivot pin and these grooves have straight inner walls 41 and bevelled outer walls 42. The walls 41 are located within the levers 22 and the bevelled walls 42 tend to hold the spring eyes 35 snugly between themselves and the levers 22 to prevent looseness and thereby avoid noise which might result therefrom.

The invention is simple in construction but it has many advantages and particularly it holds the lever devices so that they will not rattle or become noisy in operation after the usual wear of service or if they are not accurately fitted when installed. I do not limit the invention to the selected embodiment herein shown and described because it may be necessary to change the construction and arrangement of parts to adapt the invention to different types of clutches now or hereafter made, and I reserve the right to make all such changes as fairly fall within the scope of the following claims.

I claim:

1. In a friction clutch, the combination of a plurality of clutch levers, a clutch release device comprising a sleeve, a plate on the sleeve, means for moving the sleeve and plate, and an antifriction device interposed between the clutch levers and the plate and carried by the clutch levers.

2. In a friction clutch, the combination of a plurality of clutch levers, a clutch release device comprising a sleeve, a plate on the sleeve, means for moving the sleeve and plate, and an antifriction device carried by the clutch levers and comprising a cup, and a bearing block seated in the cup and arranged to be engaged by the plate.

3. In a friction clutch, the combination of a plurality of clutch levers, a clutch release device comprising a sleeve, a plate on the sleeve, means for moving the sleeve and plate, and an antifriction device comprising a cup, and a bearing block seated in the cup in position to be engaged by the plate, said antifriction device being carried by the clutch levers and the cup having fingers engaging the clutch levers.

4. In a friction clutch, the combination of a cover plate having openings therein, a pressure ring, springs interposed between the cover plate and the pressure ring thrusting the ring into operative position, posts on the ring projecting through said openings, a clutch release device, and levers pivoted on said posts and fulcrumed on said cover plate and having their free ends arranged to be operated by said release device, said levers being interengaged with said release device to prevent relative rotative movement.

5. In a friction clutch, the combination of a cover plate having openings therein, a pressure ring, springs interposed between the cover plate and the pressure ring thrusting the ring into operative position, posts on the ring projecting through said openings, a clutch release device having fingers directed toward said cover plate, and a pair of levers pivoted on each of said posts and fulcrumed on said cover plate and embracing a finger with the free end of the lever arranged to be operated by said release device.

6. In a friction clutch, the combination of a cover plate having openings therein, a pressure ring, springs interposed between the cover plate and the pressure ring thrusting the ring into operative position, posts on the ring projecting through said openings, a clutch release device having fingers directed toward said cover plate, fulcrums on the cover plate at each side of each opening therein, and a pair of levers pivoted on each post and engaging the fulcrums and embracing a finger and having their free ends arranged to be operated by said release device.

7. In a friction clutch, the combination of a cover plate having openings therein, a pressure ring, springs interposed between the cover plate and the pressure ring thrusting the ring into operative position, posts on the ring projecting through said openings, a clutch release device, a fulcrum on the cover plate adjacent each opening, a pivot pin in each post, levers mounted on said pins and engaging said fulcrums and having their free ends arranged to be operated by said release device, and springs mounted on the posts and holding said release device in contact with said levers and said levers in contact with said fulcrums.

8. In a friction clutch, the combination of a cover plate having openings therein, a pressure ring, springs interposed between the cover plate and the pressure ring thrusting the ring into operative position, posts on the ring projecting through said openings, a clutch release device, a fulcrum on the cover plate adjacent each opening, a pivot pin in each post, levers mounted on said pins and engaged with the fulcrums and having their free ends arranged to be operated by the release device, fingers on the release device, and springs mounted on the pins and having their free ends engaged with said fingers to hold the release device in engagement with the ends of the levers and the levers in engagement with the fulcrums.

9. In a friction clutch, the combination of a cover plate having openings therein, a pressure ring, springs interposed between the cover plate and the pressure ring thrusting the ring into operative position, posts on the ring projecting through said openings, a clutch release device, a fulcrum on the cover plate adjacent each opening, a pivot pin in each post, the post being recessed above the pivot pin, levers mounted on the pivot pins and engaging the fulcrums and having their free ends arranged to be operated by the release device, and springs mounted on the pivot pins, each spring having one end seated in a recess and its other end projecting in the direction of the lever and acting to hold the lever in engagement with the fulcrum.

DAVID E. GAMBLE.